United States Patent
Amaya et al.

(10) Patent No.: US 10,562,111 B2
(45) Date of Patent: Feb. 18, 2020

(54) CUTTING TOOL

(71) Applicant: Matsuura Machinery Corporation, Fukui, Fukui (JP)

(72) Inventors: Kouichi Amaya, Fukui (JP); Ryuzo Tanaka, Fukui (JP); Yoshiaki Kano, Fukui (JP); Yasunori Takezawa, Fukui (JP); Tetsuya Igarashi, Fukui (JP)

(73) Assignee: Matsuura Machinery Corporation, Fukui, (JP)

( * ) Notice: Subject to any disclaimer, the term of this patent is extended or adjusted under 35 U.S.C. 154(b) by 0 days.

(21) Appl. No.: 16/235,479

(22) Filed: Dec. 28, 2018

(65) Prior Publication Data
US 2019/0224761 A1    Jul. 25, 2019

(30) Foreign Application Priority Data
Jan. 23, 2018    (JP) ................................ 2018-008835

(51) Int. Cl.
| | |
|---|---|
| *B23B 51/06* | (2006.01) |
| *B23C 5/28* | (2006.01) |
| *B23B 51/02* | (2006.01) |
| *B23B 51/04* | (2006.01) |

(52) U.S. Cl.
CPC .............. *B23B 51/06* (2013.01); *B23B 51/02* (2013.01); *B23C 5/28* (2013.01); *B23B 51/04* (2013.01); *B23B 2251/408* (2013.01); *Y10T 408/45* (2015.01)

(58) Field of Classification Search
CPC ... B23B 51/042; B23B 51/06; B23B 2250/12; B23B 2251/408; B23C 5/28; B23C 2250/12; B23Q 11/1023; Y10T 408/45; Y10T 408/455
See application file for complete search history.

(56) References Cited

U.S. PATENT DOCUMENTS

| | | | | |
|---|---|---|---|---|
| 3,037,264 | A | * | 6/1962 | Mossberg ................. B23C 5/10 407/11 |
| 6,045,301 | A | * | 4/2000 | Kammermeier ........ B23B 51/06 408/230 |
| 6,439,811 | B1 | * | 8/2002 | Wardell ..................... B23C 5/10 407/54 |
| 9,434,011 | B2 | * | 9/2016 | Morrison ................... B23C 5/20 |
| 2006/0204345 | A1 | | 9/2006 | Borschert et al. |
| 2007/0283786 | A1 | * | 12/2007 | Kappmeyer .......... B22F 3/1055 76/101.1 |

(Continued)

FOREIGN PATENT DOCUMENTS

| | | | |
|---|---|---|---|
| DE | 2649323 A1 * | 7/1977 | ............. E21B 10/38 |
| JP | 51-133886 U | 10/1976 | |

(Continued)

*Primary Examiner* — Eric A. Gates
*Assistant Examiner* — Chwen-Wei Su
(74) *Attorney, Agent, or Firm* — Richard M. Goldberg

(57) ABSTRACT

A cutting tool 1 includes a cutting edge equipped with a helically curved groove 2 at a side outer periphery in the longitudinal direction, and a coolant passage pipe 3 extended internally and communicatively connected with ejection holes 4 of coolant arranged inside the groove 2 by way of a coolant passage pipe 31 branched from the coolant passage pipe 3 extended around a rotation center axis along the longitudinal direction or along the helically curved groove.

8 Claims, 3 Drawing Sheets

(56) References Cited

U.S. PATENT DOCUMENTS

| | | | |
|---|---|---|---|
| 2015/0328696 A1 | 11/2015 | Wang et al. | |
| 2016/0001381 A1 | 1/2016 | Lach | |
| 2016/0023290 A1* | 1/2016 | Kopton | B23D 77/00 408/1 R |

FOREIGN PATENT DOCUMENTS

| | | |
|---|---|---|
| JP | 53-91089 U | 7/1978 |
| JP | 54-022633 B2 | 8/1979 |
| JP | 58-177214 A | 10/1983 |
| JP | 60-142011 U | 9/1985 |
| JP | 61-068814 U | 5/1986 |
| JP | 61-109612 U | 7/1986 |
| JP | 61-124315 U | 8/1986 |
| JP | 61-151814 U | 9/1986 |
| JP | 63-53611 U | 4/1988 |
| JP | 1-114218 U | 8/1989 |
| JP | 2-100728 U | 8/1990 |
| JP | 2-114413 U | 9/1990 |
| JP | 3-82107 U | 8/1991 |
| JP | 4-336910 U | 11/1992 |
| JP | 5-12039 U | 2/1993 |
| JP | 10-193214 A | 7/1998 |
| JP | 11-507880 A | 7/1999 |
| JP | 2003-285220 A | 10/2003 |
| JP | 2004-106065 A1 | 4/2004 |
| JP | 2009-12142 A | 1/2009 |
| JP | 2009-078330 A | 4/2009 |
| JP | 2009-078346 A | 4/2009 |
| JP | 2010-149220 A | 7/2010 |
| JP | 2010188451 A * | 9/2010 |
| JP | 2010-537838 A | 12/2010 |
| JP | 2012-206216 A | 10/2012 |
| JP | 2013-035094 A | 2/2013 |
| JP | 2014-079810 A | 5/2014 |
| JP | 2014-108474 A | 6/2014 |
| JP | 2016-144865 A | 8/2016 |
| JP | 2017-504493 A | 2/2017 |
| WO | 2013/021856 A1 | 2/2013 |

* cited by examiner

CUTTING TOOL

BACKGROUND OF THE INVENTION

Technical Field

The present invention relates to a cutting tool which has a cutting edge equipped with a helically curved groove at a side outer periphery in a longitudinal direction and also internally has a coolant passage pipe.

Background Art

A cutting tool is provided with a cutting edge which has a helically curved groove at a side outer periphery in the longitudinal direction, regardless of whether it is of a drill configuration or it is of a flat-type milling cutter configuration.

In the case of the cutting tool of a drill configuration, a cutting edge at a leading end thereof is pivoted to cut a workpiece so as to form a hole.

In contrast thereto, in the case of the cutting tool of a milling cutter configuration, a cutting edge at a side outer periphery is used to cut a side surface of a workpiece.

In any case, the helically curved groove is in a state of being heated due to sliding with a workpiece, and there remain chips resulting from cutting in association with the sliding.

The helically curved groove has a function to remove the chips outside but cooling of the helically curved groove is performed by coolant which flows inside a coolant passage pipe provided in the cutting tool and which is discharged outside.

For example, in Patent Document 1, with focus given to the above-described cooling function of the coolant, a coolant supply channel 20 is formed in a twisted state, as with the helically curved groove (Solution of ABSTRACT and Paragraph [0023]).

In Patent Document 1, the coolant is supplied at the leading end of the drill which is a cutting tool from an ejection hole 18 to a site of a cutting edge at the leading end thereof in contact with a workpiece. However, no coolant is supplied by ejection in the helically curved groove.

In Patent Document 2 as well, in order to cool a cutting edge equipped with a helically curved groove, a cutting tool 50 has adopted a coolant passage pipe along the groove (Paragraph [0009]).

In Patent Document 2, coolant is discharged outside from a discharge port 68 at a position away from a flute 77 having a cutting function and a bushing 64 (Paragraph [0015], FIG. 3, FIG. 4), and the coolant is not discharged inside the groove.

As described above, in the case of the cutting tool having a cutting edge equipped with a helically curved groove, despite the importance of a cooling function and a chip discharging function of the cutting edge, prior art hardly focuses on the above functions which are fully exhibited by ejecting coolant inside the groove.

As a result, almost no original or inventive work has been performed for a configuration that ejects coolant inside the groove.

PRIOR ART DOCUMENTS

Patent Documents

[Patent Document 1] Japanese Published Unexamined Patent Application No. 2016-144865

[Patent Document 2] Japanese Unexamined Patent Official Announcement No. 2017-504493

SUMMARY OF INVENTION

Technical Problem

An object of the present invention is to provide a cutting tool which has a cutting edge equipped with a helically curved groove at a side outer periphery in a longitudinal direction and also internally has a coolant passage pipe, and the cutting tool which is configured to enable efficient cooling and efficient removal of chips.

Solution for Problem

In order to achieve the above object, a basic configuration of the present invention includes:

(1) a cutting tool comprising, cutting tool has a cutting edge equipped with a helically curved groove at a side outer periphery in a longitudinal direction, and in the cutting tool, ejection holes of coolant are each arranged inside the groove, a coolant passage pipe is extended around a rotation center axis along the longitudinal direction, and the coolant passage pipe is communicatively connected with each of the ejection holes by each of coolant passage pipes branched from the coolant passage pipe, and (2) a cutting tool comprising, cutting tool has a cutting edge equipped with a helically curved groove at a side outer periphery in a longitudinal direction, and in the cutting tool, ejection holes of coolant are each arranged inside the groove, a coolant passage pipe is extended along the helically curved groove, and the coolant passage pipe is communicatively connected with each of the ejection holes by each of coolant passage pipes branched from the coolant passage pipe.

Advantageous Effects of Invention

In the present invention based on the basic configurations (1) and (2), it is possible to quite efficiently cool the cutting edge formed along the groove and also remove chips remaining inside the groove by coolant ejected from the ejection holes arranged along the helically curved groove.

The above effects can be assured not only in the case that the cutting tool according to the basic configurations (1) and (2) adopts a drill configuration to cut and form an insertion hole by using the cutting edge at the leading end but also in the case that the cutting tool adopts a milling cutter configuration to cut a side of a workpiece.

BRIEF DESCRIPTION OF THE DRAWINGS

FIG. 2 shows a configuration of Example 2 in which a cutting edge is formed at the leading end of the cutting tool in the longitudinal direction.

DESCRIPTION OF EMBODIMENTS

Coolant which passes inside a cutting tool 1 is supplied by a tool holder (not shown).

Figure 3:
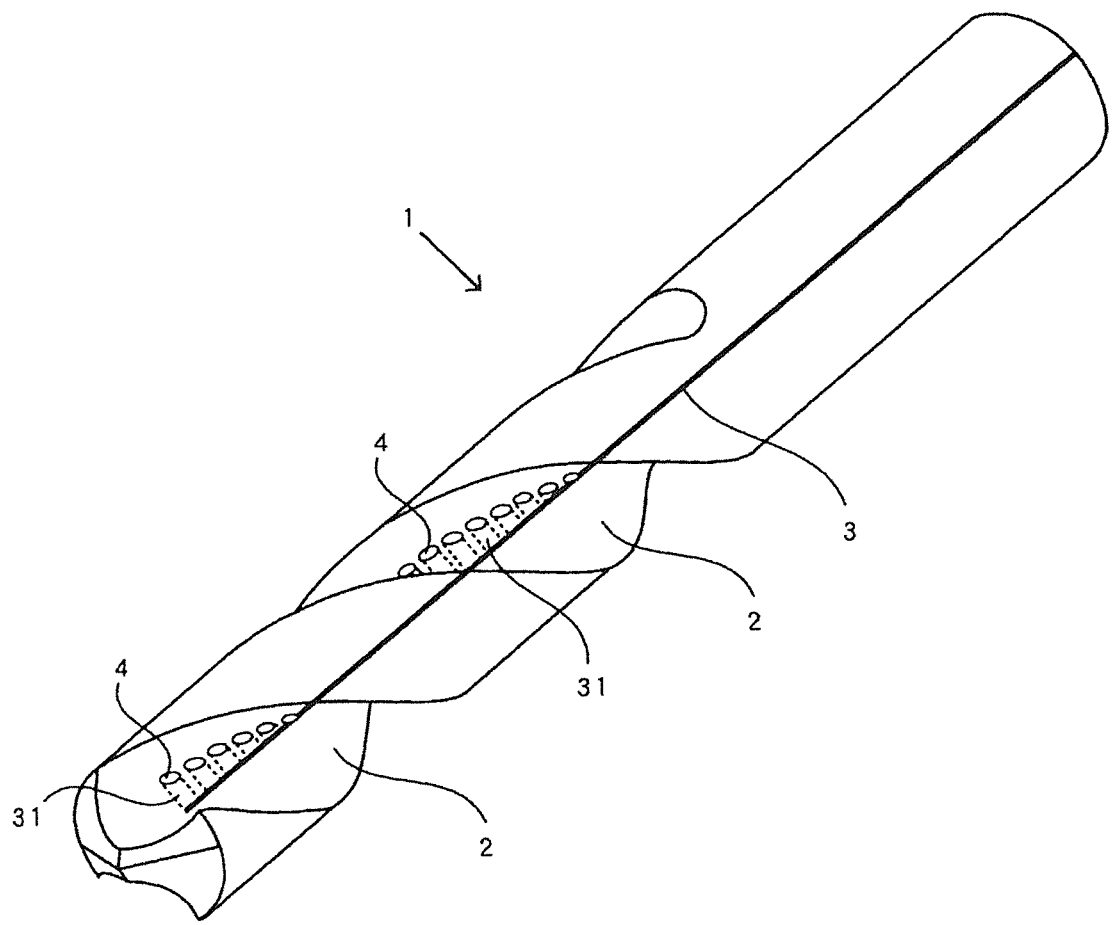
FIG. 3 is a perspective view which shows the basic configuration (1) (a thick solid line indicates a position at which a coolant passage pipe extended along the rotation center axis is located, a dotted line indicates each of coolant passage pipes branched from the extended coolant passage pipe).
Figure 4:
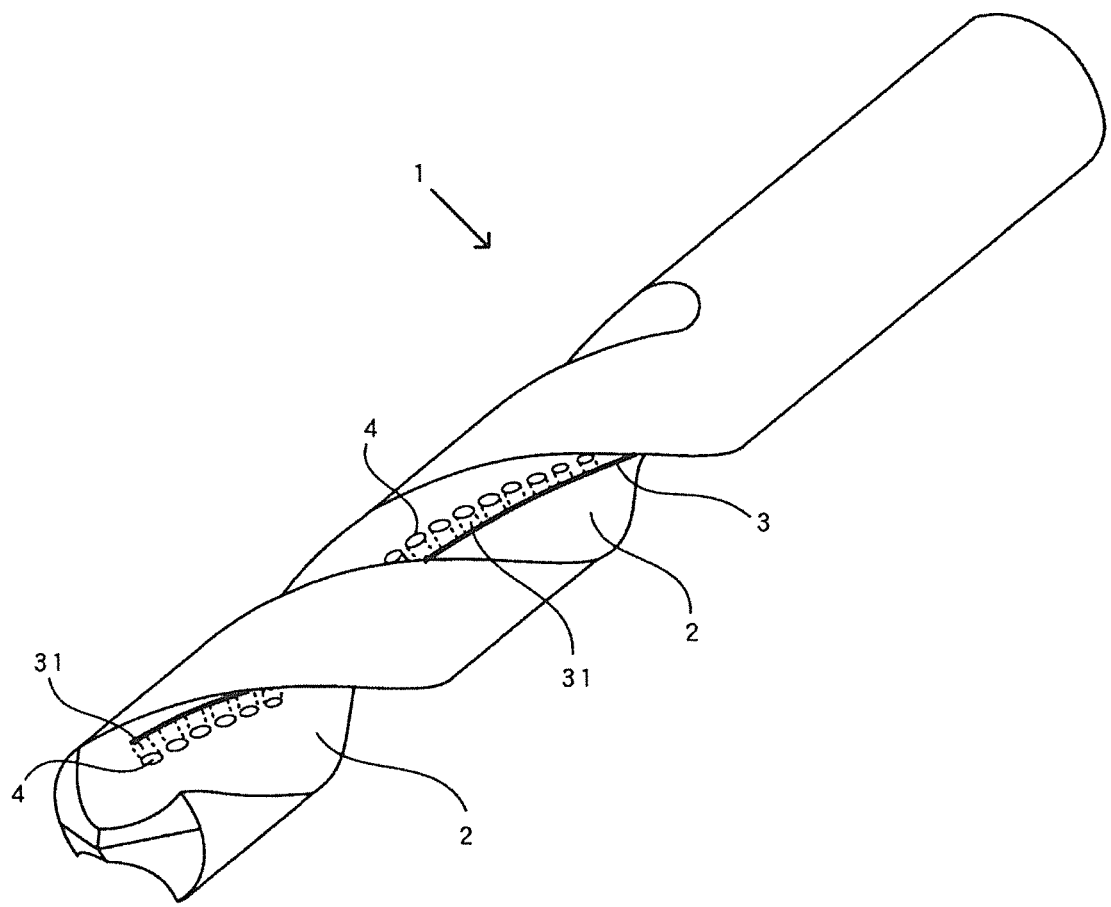
FIG. 4 is a perspective view which shows the basic configuration (2) (a thick solid line indicates a position at which a coolant passage pipe extended along a direction of a helically curved groove is located, and a dotted line indicates each of coolant passage pipes branched from the extended coolant passage pipe).

Standing on the above-described supply, in the basic configurations (1) and (2) as respectively shown in FIG. 3 and FIG. 4, by way of ejection holes 4 arranged along a helically curved groove 2, coolant is ejected inside the groove 2 to exhibit the above effects.

In the basic configuration (1), in order to achieve the above arrangement, as shown in FIG. 3, a coolant passage pipe 3 is extended around the rotation center axis along the longitudinal direction and also the coolant passage pipe 3 is communicatively connected with each of the ejection holes 4 by a coolant passage pipe 31 branched from the coolant passage pipe 3.

In contrast thereto, in the basic configuration (2), in order to achieve the above arrangement, as shown in FIG. 4, the coolant passage pipe 3 is extended along the helically curved groove 2, and the coolant passage pipe 3 is communicatively connected with each of the ejection holes 4 by the coolant passage pipe 31 branched from the extended coolant passage pipe 3.

In general, as with the case of the cutting tool 1, the basic configuration (1) is characterized in that the coolant passage pipe 3 is extended in the vicinity of the rotation center axis and simple in configuration.

The basic configuration (2) is not necessarily simple in design as compared with the basic configuration (1) in that the coolant passage pipe 3 is extended along the helically curved groove 2. However, the basic configuration (2) is superior to the basic configuration (1) in terms of a cooling effect due to the fact that the extended coolant passage pipe 3 is in the vicinity of the cutting edge.

As described so far, although the basic configurations (1) and (2) have both advantages and disadvantages, these configurations are similar in that the ejection holes 4 arranged along the helically curved groove 2 are formed at the leading end of the branched coolant passage pipe 31.

FIG. 3 and FIG. 4 respectively show a state that the basic configurations (1) and (2) are independently adopted in the single cutting tool 1. The basic configurations (1) and (2) can be, however, adopted in a state that they are used together in the single cutting tool 1.

Hereinafter, a description will be given by following examples.

Example 1

Example 1 is characterized in that each of the branched coolant passage pipes 31 is projected from the groove 2 in a direction along a surface of the groove 2.

The branched coolant passage pipe 31 is projected both at a site that the groove 2 is formed on a flat surface and at a site that the groove 2 is formed on a curved surface.

Therefore, the projection of the groove 2 along the surface means a linear projection state where the surface of the groove 2 is flat, and also a curved projection state where the surface of the groove 2 is curved.

In Example 1 as is described above, coolant flows along the surface of the groove 2, thus making it possible to promote efficient cooling inside the groove 2 and also efficient removal of chips.

In Example 1, adopting a design that the projected direction is reverse to the rotating direction of the cutting tool 1, coolant is supplied to an end portion of the cutting edge which actually contributes to cutting, of both curved ends of the groove 2, and also supplied to a site in contact with a workpiece. Thereby, it is possible to remarkably promote the efficient cooling and efficient removal of chips.

Figure 1A:
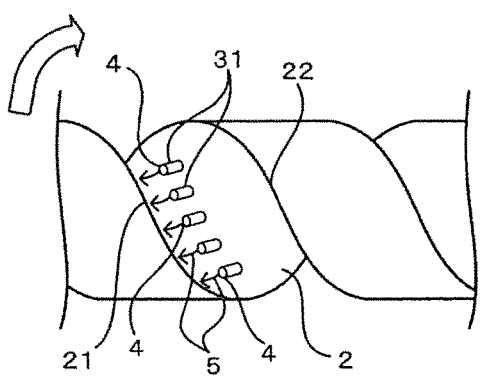
FIG. 1 shows a configuration of Example 1 in which branched coolant passage pipes are projected from a groove, FIG. 1(a) and FIG. 1(b) respectively show a side elevational view in which the projected position is at a site deepest at the groove and a cross sectional view thereof in a direction orthogonal to the longitudinal direction, and FIG. 1(c) and FIG. 1(d) respectively show a side elevational view in which the projected position is at a site near one side end portion at which the groove is curved and a cross sectional view thereof in a direction orthogonal to the longitudinal direction.
Figure 1B:
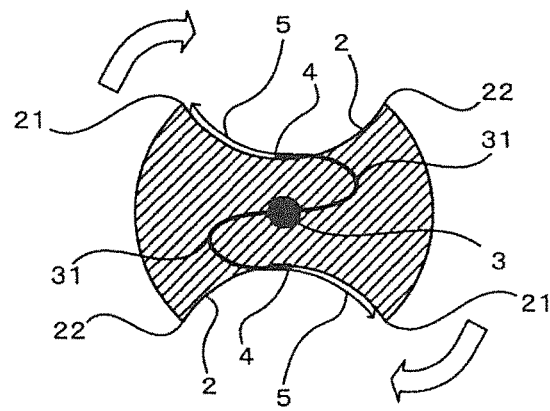
Figure 1C:
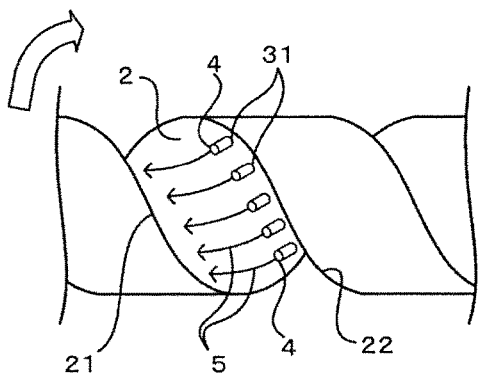
Figure 1D:
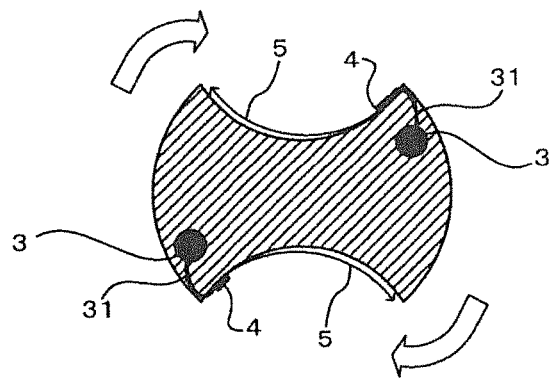

In Example 1, as shown in FIGS. 1(a) and (b), adopting a design that the projected position is at a site deepest at the groove 2, and as shown in FIGS. 1(c) and (d), adopting a design that the projected position is at a site in the vicinity of one side end portion at which the groove 2 is curved, these positions form a flat surface of the groove 2 in most cases. It is, therefore, possible to achieve a simple design (FIG. 1(b) stands on the basic configuration (1) as apparent from a position indicated in the cross sectional view of the coolant passage pipe 3 extended in the longitudinal direction, and FIG. 1(d) stands on the basic configuration (2) as apparent from a position indicated in the cross sectional view of the coolant passage pipe 3 extended in the longitudinal direction).

In addition, in each of the above-described designs, the ejection holes 4 are arranged regularly, thus it is possible to reliably promote efficient cooling and efficient removal of chips in Example 1.

Example 2

Figure 2A:
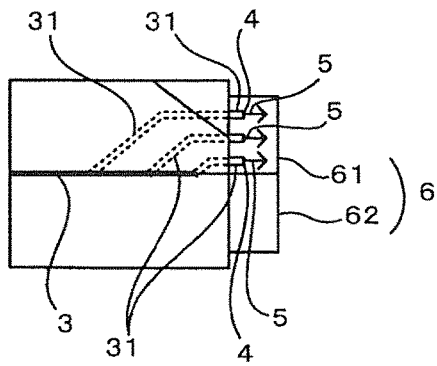
FIG. 2(a) shows a side elevational view of a leading end portion along the longitudinal direction (a narrow arrow at the leading end portion indicates a flowing direction of coolant) and FIG. 2(b) shows a front elevational view in a direction orthogonal to the longitudinal direction (a narrow arrow at the leading end portion indicates a flowing direction of coolant).
Figure 2B:
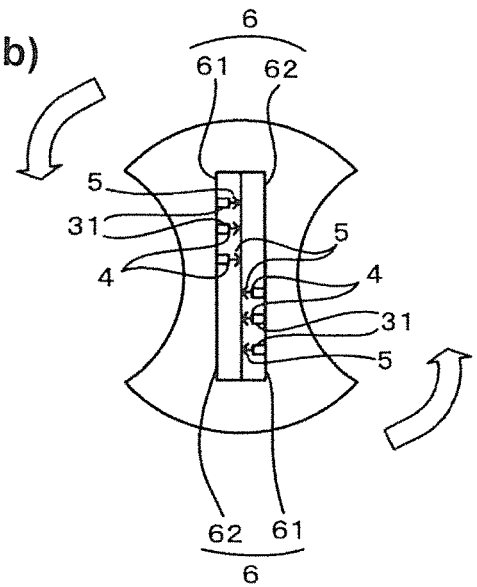

As shown in FIGS. 2(a) and (b), Example 2 is characterized that a cutting edge 6 formed by both side surfaces 61, 62 raised from the leading-end surface is provided at the leading end of the cutting tool 1 of a drill configuration in the longitudinal direction and, of the both side surfaces 61, 62, on the side surface 61 on a rotating direction side, the extended coolant passage pipe 3 or the coolant passage pipe 31 branched from the pipe 3 is projected from the side surface 61 in a direction along the side surface 61 (in FIG. 2(a), (b), there is shown a case where the branched coolant passage pipe 31 is projected).

In Example 2 standing on the above characteristics, coolant flows along a surface on a rotating direction side which is raised at the leading end of the cutting tool 1 of a drill configuration in the longitudinal direction and also supplied to a site of the cutting edge 6 in contact with a workpiece. Thereby, the coolant is able to contribute to an efficient cooling effect and efficient removal of chips.

INDUSTRIAL APPLICABILITY

As described so far, the present invention has a cutting edge equipped with a helically curved groove to achieve efficient cooling and efficient removal of chips by coolant. And the present invention can be used widely in cutting for forming insertion holes by a drill and cutting a side surface by a milling cutter.

EXPLANATION ON SIGNS

1: Cutting tool
2: Groove
21: End portion of groove which faces a surface in rotating direction
22: End portion of groove which faces a surface on reverse to a rotating direction side
3: Coolant passage pipe extended in longitudinal direction
31: Branched coolant passage pipe
4: Ejection hole
5: Coolant
6: Cutting edge on leading-end side in longitudinal direction
61: Side surface on a rotating direction side, of both side surfaces which are raised from leading-end surface
62: Side surface on reverse to the rotating direction side, of both side surfaces which are raised from leading-end surface

The invention claimed is:

1. A cutting tool comprising:
  a cutting edge equipped with only one helically curved groove at a side outer periphery in a longitudinal direction, and a plurality of spaced apart ejection holes for a coolant arranged inside the groove,
  a main coolant passage pipe extended in a direction of a rotation center axis along the longitudinal direction, and
  branched coolant passage pipes branched from the main coolant passage pipe and each communicatively connected with a respective one of the ejection holes,
  wherein each branched coolant passage pipe extends outwardly from the groove in a direction along the groove surface and is distributed along said helical curve direction in a linear state, and
  wherein a projected direction of each branched coolant passage pipe extending outwardly from the groove is slanted to the longitudinal direction with a reverse direction to the rotating direction of the cutting tool.

2. The cutting tool according to claim 1, wherein each branched coolant passage pipe extends outwardly from the groove at a position which is at a site which is deepest at the groove.

3. The cutting tool according to claim 1, wherein each branched coolant passage pipe extends outwardly from the groove at a position which is at a site in the vicinity of one side end portion in which the groove is curved, and the projected direction faces a rotation center axis side.

4. The cutting tool of claim 1, wherein said direction along the groove surface is generally orthogonal to the axis of the main coolant passage pipe 3, and generally orthogonal to a radial direction from the main coolant passage pipe.

5. A cutting tool comprising:
  a cutting edge equipped with only one helically curved groove at a side outer periphery in a longitudinal direction, and a plurality of spaced apart ejection holes for a coolant arranged inside the groove,
  a main coolant passage pipe extended along the helically curved groove, and
  branched coolant passage pipes branched from the main coolant passage pipe and each communicatively connected with a respective one of the ejection holes,
  wherein each branched coolant passage pipe extends outwardly from the groove in a direction along the groove surface and is distributed along said helical curve direction in a linear state, and
  wherein a projected direction of each branched coolant passage pipe extending outwardly from the groove is slanted to the longitudinal direction with a reverse direction to the rotating direction of the cutting tool.

6. The cutting tool according to claim 5, wherein each branched coolant passage pipe extends outwardly from the groove at a position which is at a site which is deepest at the groove.

7. The cutting tool according to claim 5, wherein each branched coolant passage pipe extends outwardly from the groove at a position which is at a site in the vicinity of one side end portion in which the groove is curved, and the projected direction faces a rotation center axis side.

8. The cutting tool of claim 5, wherein said direction along the groove surface is generally orthogonal to the axis of the main coolant passage pipe 3, and generally orthogonal to a radial direction from the main coolant passage pipe.

* * * * *